United States Patent Office
2,768,998
Patented Oct. 30, 1956

2,768,998

VAT DYESTUFFS CONTAINING SULFUR AND PROCESS OF MAKING SAME

Emil Schwamberger, Frankfurt am Main Fechenheim, Germany, assignor to Cassela Farbwerke Mainkur Aktiengesellschaft, Frankfurt am Main Fechenheim, Germany, a company of Germany No Drawing. Application October 22, 1952,
Serial No. 316,303

Claims priority, application Germany October 31, 1951

2 Claims. (Cl. 260—131)

The present application is a continuation-in-part of my application Serial No. 247,908, filed September 22, 1951, now Patent No. 2,645,634, and relating to vat dyestuffs containing sulfur and a process of making same.

My invention relates to vat dyestuffs containing sulfur and a process of making same.

U. S. Patent No. 2,645,634 of July 14, 1953 describes the manufacture of vat dyestuffs ranging in color from yellowish olive to green. These dyestuffs are obtained by treating dianthrone ethylene

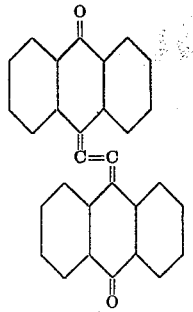

or one of its substitution products with a condensing agent customary for the Friedel-Crafts reaction, e. g. aluminium chloride, and a sulfurizing agent. As sulfurizing agent may be used a halide of sulfur or of sulfurous acid, or sulfur itself. The dyestuffs thus obtained which are characterized by a red to red-violet color of solution in sulfuric acid, dye from a violet vat cotton and related fibres brown, yellowish olive to yellowish green shades, most of which have excellent fastness properties.

It has now been found that compounds of the same class of dyestuffs are obtained by replacing the employed condensing agents which are customary for the Friedel-Crafts reaction wholly or partially by other acidic condensing agents, in particular sulfuric acid or chlorosulfonic acid. As sulfurizing agents may be cited: sulfur or compounds capable of delivering sulfur, such as alkali sulfides or thiosulfates, the blue solution of sulfur in oleum, furthermore halides of sulfur or of sulfurous acid. The reaction may be carried out at room temperature, with the use of cooling or at elevated temperature.

The following examples, in which the parts are parts by weight, are given for the purpose of illustrating the invention:

*Example 1*

Into 180 parts of 98% sulfuric acid, there are introduced at 70–80° C. 5 parts of sulfur chloride and 5 parts of the dichlorodianthrone ethylene obtained from 2-chloroanthrone according to German patent specification 470,501 and stirred for about 1½ hours at 70–80° C. After pouring the red-violet solution onto ice, a dyestuff containing sulfur is obtained, which dyes cotton and related fibres from a violet vat olive shades.

*Example 2*

A mixture of 80 parts of chlorosulfonic acid, 5 parts of aluminium chloride, 1.5 parts of sulfur chloride, 8 parts of thionyl chloride and 5 parts of the starting material used in Example 1 are heated to 50° C. and stirred for about 1 hour at this temperature. After pouring on ice a dyestuff is obtained which dyes cotton from a red-violet vat fast olive green shades.

*Example 3*

In 180 parts of sulfuric acid monohydrate, 10 parts of the dichlorodianthrone ethylene mentioned in Example 1 are dissolved. 5 parts of sulfur chloride are then introduced at room temperature. The temperature rises somewhat and is kept at 30° C. for about 2 hours.

After pouring on ice a dyestuff containing sulfur is obtained which dyes cotton from a violet vat fast olive green shades.

*Example 4*

In 180 parts of chlorosulfonic acid there are dissolved 5 parts of the dianthrone ethylene obtainable from anthrone according to German patent specification 470,501. 3 parts of sulfur chloride are then added followed by stirring at +5 to 10° C. for about 4 hours. After pouring on ice an olive green vat dyestuff is obtained. The product contains sulfur. The color of solution in concentrated sulfuric acid is wine-red.

*Example 5*

Into 180 parts of chlorosulfonic acid at 60–65° C. a mixture of 5 parts of the dichlorodianthrone ethylene mentioned in Examples 1 and 2 parts of finely ground sulfur is introduced and stirred for about ½ hour at 60–65° C.

After pouring on ice the olive green product is filtered by suction, washed and dried. Thereafter, it is extracted with carbon sulfide whereby any sulfur not being a part of the molecule is dissolved and removed.

A vat dyestuff containing sulfur is thus obtained, which dyes cotton and related fibres from a violet vat olive green shades.

If in the present example sulfuric acid containing about 5% sulfuric acid anhydride is used instead of chlorosulfonic acid, after a reaction during about two hours at 30–40° C. there is obtained an olive green product which is partially sulfurized.

*Example 6*

Into 80 parts of chlorosulfonic acid, a mixture of 5 parts of the starting material employed in Example 1, and 4 parts of anhydrous sodium sulfide is slowly introduced at about 40–50° C. followed by raising the temperature to 60–65° C. until a sample given on water produces an olive green precipitation.

After isolating the dyestuff as indicated in Example 5, cotton is dyed from a violet vat olive green shades.

*Example 7*

10 parts of the dichlorodianthrone ethylene mentioned in Example 1 are dissolved in 180 parts of sulfuric acid monohydrate, into which solution a solution of 2 parts of sulfur in 50 parts of oleum having a content of 40% SO₃ is dropped. Thereafter, stirring is performed at +5 to 10° C. until a sample taken furnishes, on introducing into water, an olive green precipitation.

After pouring the reaction mass onto ice, an olive green product is obtained which can be freed of uncombined sulfur by a treatment with desulfurizing agents (e. g. a 5% solution of sodium sulfide).

The dyestuff contains sulfur and dyes from a red-violet vat cotton and related fibres olive green shades with good fastness properties.

If the above described reaction immediately after change of color of the originally olive green solution to red-violet is discontinued by pouring on ice, a product is obtained which contains sulfur and dyes from a violet vat violet-brown shades.

*Example 8*

To a solution of 10 parts of the tetrachlorodinanthrone ethylene obtainable according to German patent specification 470,501 from 2,6-dichloroanthrone in 180 parts of sulfuric acid monohydrate, a solution of 2 parts of sulfur in 50 parts of oleum having a content of 40% $SO_3$ is dropped at about 20° C. and stirred for about 2 hours.

After pouring the reaction mass on ice, a dyestuff is obtained which dyes cotton and related fibres from a violet vat brown shades. The product contains sulfur. The color of solution in concentrated sulfuric acid is red-violet.

*Example 9*

To a solution of 10 parts of the starting material employed in Example 1 in 180 parts of chlorosulfonic acid, 20 parts of potassium xanthogenate are introduced whilst cooling. After stirring for about 20 hours at room temperature, the temperature is raised to 70–75° C. and maintained as long as the color of the solution becomes deep wine-red (about ½ hour). After pouring on ice, a sulfur containing product is obtained which dyes cotton and related fibres from a violet vat brown shades.

I claim:

1. Process which comprises treating a vat dyestuff of the group consisting of dianthrone ethylene, dichlorodianthrone ethylene and tetrachlorodianthrone ethylene with an acidic condensing agent of the group consisting of sulfuric acid, fuming sulfuric acid and chlorosulfonic acid, and with a sulfurizing agent of the group consisting of sulfur, sulfur chloride, thionyl chloride, sodium sulfide and sodium xanthogenate to obtain a sulphur-containing dyestuff.

2. Process which comprises treating dichlorodianthrone ethylene with sulfuric acid and sulfur chloride to obtain a sulphur-containing dyestuff.

References Cited in the file of this patent

"Organic Reactions" (Adams et al.), vol. 3. Published by Wiley and Sons, Inc., New York, 1947 (page 2 relied on).